(12) United States Patent
Komatsu et al.

(10) Patent No.: US 6,261,647 B1
(45) Date of Patent: *Jul. 17, 2001

(54) METHOD AND APPARATUS FOR MANUFACTURING MAGNETIC RECORDING MEDIUM

(75) Inventors: Kazunori Komatsu; Norio Shibata, both of Odawara (JP)

(73) Assignee: Fuji Photo Film Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/591,037

(22) Filed: Jan. 25, 1996

(30) Foreign Application Priority Data

Jan. 2, 1995 (JP) .................................................. 7-015152

(51) Int. Cl.$^7$ ...................................................... H01F 1/00
(52) U.S. Cl. .................... 427/549; 118/620; 427/128; 427/130; 427/550; 427/599
(58) Field of Search .................... 427/548, 549, 427/550, 599, 128–132

(56) References Cited

U.S. PATENT DOCUMENTS

| | | | |
|---|---|---|---|
| 3,026,215 | 3/1962 | Fukuda et al. | 117/93 |
| 3,031,341 | 4/1962 | Eschenfelder | 117/138.8 |
| 3,100,194 | 8/1963 | van der Brugt et al. | 252/62.5 |
| 3,242,005 | 3/1966 | Morita et al. | 117/160 |
| 3,389,014 | 6/1968 | Akashi et al. | 117/93.2 |
| 3,413,141 | * 11/1968 | Friedman | 427/599 |
| 3,681,138 | * 8/1972 | Ankenbrand et al. | 427/599 |
| 4,931,309 | * 6/1990 | Komatsu et al. | |
| 5,474,814 | * 12/1995 | Komatsu et al. | 427/599 |

FOREIGN PATENT DOCUMENTS

| | | |
|---|---|---|
| 3-35420 | 2/1991 | (JP) . |
| 6-309661 | 11/1994 | (JP) . |

OTHER PUBLICATIONS

English Abstract of Japanese Patent Application No. 3–35420 (3 pgs.). (No date avail.).

Enblish Abstract of Japanese Patent Application No. 6–309661 (2 pgs.) (No date avail).

\* cited by examiner

*Primary Examiner*—Bernard Pianalto
(74) *Attorney, Agent, or Firm*—Brinks Hofer Gilson & Lione; G. Peter Nichols

(57) ABSTRACT

A method for manufacturing a magnetic recording medium includes steps of forming a magnetic layer containing magnetic powder particles on a web-like non-magnetic support being continuously transported in one direction and applying a magnetic field to the magnetic layer by a plurality of magnets in such a manner that an angle of the magnetic field applied to the magnetic layer to the transporting direction of the non-magnetic support in a plane perpendicular to a surface of the magnetic layer and parallel to the transporting direction of the non-magnetic support gradually increases in the transporting direction of the non-magnetic support, thereby orienting the magnetic powder particles in an oblique direction with respect to the surface of the magnetic layer. According to this method, it is possible to orient magnetic powder particles in a desired direction with respect to the surface of a magnetic layer and to manufacture a magnetic recording medium having a high squareness ratio without increasing the size of the apparatus.

12 Claims, 3 Drawing Sheets

METHOD AND APPARATUS FOR MANUFACTURING MAGNETIC RECORDING MEDIUM

BACKGROUND OF THE INVENTION

The present invention relates to a method for manufacturing a magnetic recording medium and an apparatus therefor, and, in particular, to a method for manufacturing such a medium by orienting magnetic powder particles contained in a magnetic layer thereof in an oblique direction with respect to the surface of the magnetic layer and an apparatus therefor.

DESCRIPTION OF THE PRIOR ART

Conventionally, a web-like magnetic recording medium has been manufactured by orienting magnetic powder particles contained in a magnetic layer thereof in a direction parallel to the surface of the magnetic layer and in the longitudinal direction of the magnetic recording medium.

However, in the case where magnetic powder particles are oriented in the longitudinal direction of a magnetic recording medium, the demagnetization field in the medium becomes greater. As a result, the improvement in recording density is limited. Namely, the output can be improved in the long wavelength region, but the output is poor in the short wavelength region.

Therefore, a vertical orientation method has been proposed in which the magnetic powder particles are oriented by applying a magnetic field in the thickness direction of the magnetic layer of the magnetic recording medium.

According to this method, the demagnetization field falls with increasing recording density. The method is therefore advantageous for high density recording and recording in the short wavelength region. However, the output in the long wavelength region decreases because the squareness ratio in the vertical direction cannot be increased to the desired value.

Because of this, it has been attempted to solve problems in orientation using an oblique orientation method which achieves an improvement in electromagnetic conversion characteristics and high output from the short wavelength region to the long wavelength region by orienting magnetic powder particles in an oblique direction making an angle of 10 degrees to 70 degrees with the longitudinal direction of the magnetic recording medium in a plane perpendicular to the surface of the magnetic layer and parallel to the longitudinal direction of the magnetic recording medium.

In the conventional oblique orientation method, a magnetic field oblique to the surface of the magnetic layer is generated by disposing a pair of magnets at a predetermined angle to the surface of the magnetic layer, thereby orienting the magnetic powder particles in the magnetic layer obliquely to the surface of the magnetic layer.

However, it is difficult in this method to generate a magnetic field having a small angle to the surface of the magnetic layer and, therefore, the magnetic powder particles cannot be oriented in the desired oblique direction. Further, since this method requires the positions of the pair of magnets to be changed so as to interpose the magnetic recording medium therebetween in accordance with the angle at which magnetic powder particles are to be oriented, the apparatus inevitably becomes large. Moreover, since the magnets are disposed at a predetermined angle to the surface of the magnetic layer, the area where the magnetic powder particles are oriented is small and, therefore, it is impossible to efficiently produce a magnetic recording medium having a high squareness ratio in a desired oblique direction.

Japanese Patent Application Laid Open No. 3-35420 therefore proposes an oblique orientation method which orients the magnetic powder particles in an oblique direction to the surface of the magnetic layer by simultaneously applying a magnetic field substantially perpendicular to the surface of the magnetic layer and a magnetic field substantially parallel to the surface of the magnetic layer and generating a magnetic field oblique to the surface of the magnetic layer as the vector sum of the two magnetic fields.

According to this method, the magnetic powder particles can be oriented at an arbitrary angle by appropriately selecting the strength of the magnet for generating the magnetic field substantially perpendicular to the surface of the magnetic layer and the magnet for generating the magnetic field substantially parallel to the surface of the magnetic layer. Since it is therefore unnecessary to change the positions of the magnets when the angle at which the magnetic powder particles are to be oriented is changed, the size of the apparatus can be reduced.

In this method, however, the oblique magnetic field must be applied to the magnetic powder particles for a long time in order to achieve uniformly orientation. Therefore, if the time period for orientation is made short, the magnetic powder particles cannot be sufficiently oriented and the squareness ratio of the magnetic recording medium is low. On the other hand, if the orientation is effected for a sufficient time period, the apparatus inevitably becomes large.

Japanese Patent Application Laid Open No. 6-309661 proposes an oblique orientation method which orients magnetic powder particles in an oblique direction to the surface of the magnetic layer by applying a magnetic field parallel to the surface of the magnetic layer in the longitudinal direction of the magnetic recording medium and then applying a magnetic field oblique to the surface of the magnetic layer.

This method once orients the magnetic powder particles in the longitudinal direction parallel to the surface of the magnetic layer by applying a magnetic field parallel to the surface of the magnetic layer in the longitudinal direction and then orients them at an angle to the surface of the magnetic layer by applying a magnetic field having an oblique angle thereto. However, even in this method, it is necessary to apply an oblique magnetic field to the magnetic powder particles for a long time in order to uniformly orient them. Therefore, if the time period for orientation is made short, the magnetic powder particles cannot be sufficiently oriented and the squareness ratio of the magnetic recording medium is low. On the other hand, if the orientation is to be effected for a sufficient time period, the apparatus inevitably becomes large.

SUMMARY OF THE INVENTION

It is therefore an object of the present invention to provide a method and an apparatus for manufacturing a magnetic recording medium which can orient magnetic powder particles to a desired direction with respect to the surface of a magnetic layer and manufacture a magnetic recording medium having a high squareness ratio without increasing the size of the apparatus.

The above and other objects of the present invention can be accomplished by a method for manufacturing a magnetic recording medium comprising steps of forming at least one magnetic layer containing magnetic powder particles on a web-like non-magnetic support being continuously transported in one direction and applying a magnetic field to the magnetic layer by a plurality of magnets in such a manner that an angle of the magnetic field applied to the magnetic layer to the transporting direction of the non-magnetic support in a plane perpendicular to a surface of the magnetic layer and parallel to the transporting direction of the non-magnetic support gradually increases in the transporting direction of the non-magnetic support, thereby orienting the magnetic powder particles in an oblique direction with respect to the surface of the magnetic layer.

The above and other objects of the present invention can be also accomplished by an apparatus for manufacturing a magnetic recording medium comprising first magnet means for generating a magnetic field perpendicular to a surface of at least one magnetic layer formed on a non-magnetic support and containing magnetic powder particles and second magnet means for generating a horizontal magnetic field parallel to the surface of the magnetic layer and having a predetermined direction in the magnetic field generated by the first magnet means, the second magnet means generating the horizontal magnetic field so as to decrease gradually in strength from one end of the magnetic field generated by the first magnet means in the predetermined direction to the other end thereof.

In a preferred aspect of the present invention, the magnetic powder particles are oriented by the plurality of magnets in the oblique direction after they have been once oriented in the longitudinal direction by a magnetic field in a direction parallel to the surface of the magnetic layer and the transporting direction of the non-magnetic support.

In a further preferred aspect of the present invention, drying means is further provided for drying the magnetic layer and the magnetic powder particles are oriented by the plurality of magnets while the magnetic layer is being dried by the drying means.

In a further preferred aspect of the present invention, the second magnet means is provided with an extended portion extending from the one end in a direction away from the other end.

In a further preferred aspect of the present invention, the first magnet means comprise permanent magnets disposed so that opposite poles thereof face each other and the second magnet means comprise at least two solenoid coils.

In the present invention, the plurality of magnets includes two permanent magnets. The direction and strength of the magnetic field generated by the permanent magnets can be controlled by selecting the material and shape thereof, adjusting the distance between them and other such means.

In the present invention, the plurality of magnets includes at least two solenoid coils. The direction and strength of the magnetic field generated by the solenoid coils can be controlled by adjusting current supplied thereto, the wind density thereof, the diameter thereof and other such means.

An "oblique direction" as termed in the present invention means a direction whose an angle to the transporting direction of the non-magnetic support in a plane perpendicular to the surface of the magnetic layer and parallel to the transporting direction of the non-magnetic support is 10 degrees to 90 degrees. Since the squareness ratio improves as this angle increases, this angle is preferably between 30 degrees and 90 degrees.

In the present invention, the step of "applying a magnetic field to the magnetic layer by a plurality of magnets in such a manner that an angle of the magnetic field applied to the magnetic layer to the transporting direction of the non-magnetic support in a plane perpendicular to a surface of the magnetic layer and parallel to the transporting direction of the non-magnetic support gradually increases in the transporting direction of the non-magnetic support" include not only the case where the direction of the magnetic field applied by the magnet disposed most upstream among the plurality of magnets is parallel to the surface of the magnetic layer and the transporting direction of the non-magnetic support but also the case where the direction of the magnetic field applied by the magnet disposed most upstream is closer to the direction parallel to the surface of the magnetic layer and the transporting direction of the non-magnetic support than the directions of the magnetic fields applied by magnets disposed downstream.

The present invention does not particularly specify the magnetic powder particles contained in the magnetic layer. Examples of magnetic powder particles usable in the present invention include well-known ferromagnetic powder particles such as γ-iron oxide ferromagnetic powder particles, Co-containing γ-iron oxide ferromagnetic powder particles, ferromagnetic metal powders, ferromagnetic alloy powders, nitride ferromagnetic powder particles, barium ferrite powders and strontium ferrite powders. Among them, ferromagnetic powder particles containing α-Fe as a main component is particularly preferable. The ferromagnetic powder particles may contain Al, Si, S, Sc, Ca, Ti, V, Cr, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B or the like in addition to the aforesaid elements. In particular, it is preferable that the ferromagnetic powder particles contain Al, Si, Ca, Y, Ba, La, Nd, Co, Ni, B in addition to an γ-Fe. These ferromagnetic powder particles may be treated with a dispersant, lubricant, surfactant, antistatic agent or the like prior to being dispersed. Specific examples of the magnetic powder particles are disclosed by, for example, Japanese Patent Publication No.44-14090, Japanese Patent Publication No. 45-18372, Japanese Patent Publication No. 47-22062, Japanese Patent Publication No. 47-22513, Japanese Patent Publication No.46-28466, Japanese Patent Publication No. 46-38755, Japanese Patent Publication No. 47-4286, Japanese Patent Publication No. 47-12422, Japanese Patent Publication No. 47-17284, Japanese Patent Publication No.47-18509, Japanese Patent Publication No. 47-18573, Japanese Patent Publication No. 39-10307, Japanese Patent Publication No. 48-39639, U.S. Pat. Nos. 3,026,215, 3,031,341, 3,100,194, 3,242,005, 3,389,014 and the like.

The ferromagnetic metal powders used in the present invention may contain a small amount of hydroxide or oxide.

Ferromagnetic metal powders prepared by known processes can be used. For instance, it is possible to use in the present invention ferromagnetic metal powders prepared by reducing iron oxide with a composite organic acid salt such as oxalate and a reducing gas such as hydrogen, Fe or Fe—Co particles produced by reducing iron oxide with hydrogen or the like, ferromagnetic metal powders prepared by thermally decomposing a metal carbonyl compound, ferromagnetic metal powders prepared by reducing an aqueous ferromagnetic metal solution by adding a reducing agent such as a hydrogenated boron sodium, a hypophosphite salt and a hydrazene thereto, or ferromagnetic metal powders prepared by vaporizing a metal in inert gas at a low pressure. The ferromagnetic metal powders obtained by these methods may be subjected to a known gradual oxidation treatment such as a process which comprises immersing the ferromagnetic alloy powders in an organic solvent with an oxygen-containing gas bubbled thereinto to form an oxide film on the surface of the ferromagnetic alloy powders and then drying the material, and a process which comprises controlling the partial pressure of oxygen gas and inert gas instead of using an organic solvent to form an oxide film on the surface of the ferromagnetic alloy powders.

In the present invention, the coercive force Hc of the ferromagnetic metal powders contained in the magnetic layer is in the range of 1000 to 4000 Oe, preferably 1200 to 3500 Oe and more preferably 1500 to 3000 Oe. The saturation magnetization as of the ferromagnetic metal powders is in the range of 110 to 190 emu/g, preferably 125 to 180 emu/g and more preferably 130 to 160 emu/g. The length of the long axis of the ferromagnetic metal powders is in the range of 0.03 to 0.25 $\mu$m, preferably 0.04 to 0.15 $\mu$m and more preferably 0.05 to 0.13 $\mu$m. The crystallite size of the ferromagnetic metal powders is in the range of 80 to 300 angstroms, preferably 100 to 200 angstroms and more preferably 120 to 190 angstroms. The acicular ratio of the ferromagnetic metal powders is preferably in the range of 3 to 18 and more preferably 3 to 12. The ferromagnetic metal powders preferably exhibit a water content in the range of 0.01 to 2% and the water content of the ferromagnetic metal powders is preferably optimized for the binder used in combination therewith.

In the present invention, the specific surface area determined by the BET method is preferably from 45 to 80 $m^2/g$ and more preferably from 50 to 70 $m^2/g$. If the specific surface area falls below 45 $m^2/g$, the resulting magnetic recording medium exhibits high noise and if the specific surface area exceeds 80 $m^2/g$, the desired surface properties cannot be obtained.

In the present invention, the pH value of the ferromagnetic metal powders is preferably optimized in accordance with the binder to be used in combination therewith. The pH value of the ferromagnetic metal powders is preferably in the range of 4 to 12 and more preferably 6 to 10. The ferromagnetic metal powders may be subjected to surface treatment by Al, Si, P or an oxide thereof. The amount of surface treating agent is in the range of 0.1 to 10% by weight per 100% by weight of the ferromagnetic metal powders. It is preferable for the ferromagnetic metal powders to be subjected to surface treatment, since the amount of absorption of a lubricant such as a aliphatic acid becomes lower than 100 $mg/m^2$. The ferromagnetic metal powders may contain soluble inorganic ions such as Na, Ca, Fe, Ni, Sr or the like. If the total amount of the inorganic ions is 200 ppm or less, they do not affect the property of the ferromagnetic metal powders.

The ferromagnetic powder particles used in the present invention have a small void ratio as possible. The void ratio is preferably 20 vol % or less and more preferably 5 vol % or less. In connection with the shape of the ferromagnetic metal powders particles, an acicular, particulate, rice grain-like or plate-like ferromagnetic metal powders particle satisfying the above mentioned requirements regarding crystallite size and acicular ration can be used. It is necessary to reduce the distribution of Hc of the ferromagnetic metal powders for making the SFD value of the ferromagnetic metal powders to be equal to or lower than 0.6. For this purpose, a process for improving the particle size distribution of geothite, a process for preventing γ-hematite from being sintered or the like can be used.

The magnetic layer may contain abrasives. As abrasives to be used in the present invention, known materials having a Mohs' hardness of 6 or more such as α-aluminum having an alpha conversion of 90% or more, β-aluminum, silicon carbide, chromium oxide, cerium oxide, corundum, artificial diamond, silicon nitride, titanium carbide, titanium oxide, and boron nitride may be used singly or in combination. A composite material made of these abrasives, namely, an abrasive surface-treated with another abrasive may be used. These abrasives may contain compounds or elements other than the main component. The abrasives to be used in the present invention may be in the form of an acicular, spherical or die-like shape and preferably have edges on part of the surface thereof to provide a high abrasion ability. Specific examples of abrasives to be used in the present invention include AKP-50 and HIT-50 manufactured by Sumitomo Chemical Co., Ltd., S7 and S-1 manufactured by Nippon Chemical Industrial Co., Ltd., 100ED and 140ED manufactured by Toda Kogyo Co., Ltd. and the like. The abrasives may be incorporated into the magnetic coating solution in the form of a dispersion in a binder.

In the present invention, a single or multiple magnetic layers may be formed and the magnetic recording medium may comprise a non-magnetic layer in which non-magnetic powder particles are dispersed in a binder.

In the case where only a magnetic layer is provided on a non-magnetic support, since the magnetic layer has to contain antistatic agents and abrasives for improving the antistatic ability and the abrasive ability of the magnetic recording medium, the packing density of the ferromagnetic powder particles is lowered. However, if a non-magnetic layer in which non-magnetic powder particles are dispersed in a binder is provided on a non-magnetic support and a magnetic layer is formed thereon, since the antistatic ability and the abrasive ability of the magnetic recording medium can be improved by causing the non-magnetic layer to contain antistatic agents, abrasives and the like, it is possible to prevent the packing density of the ferromagnetic powder particles from being lowered.

The non-magnetic powder particles to be contained in the non-magnetic layer are preferably at least one kind of non-magnetic powder particles selected from the group consisting of titanium oxide, barium sulfate, silica, α-aluminum, zinc oxide, α-iron oxide, cerium oxide, tin oxide and zirconia.

The particle size of these non-magnetic powder particles is preferably 0.01 to 2 $\mu$m, but non-magnetic powder particles having different particle sizes may be used in combination, as occasion demands. For instance, 30 weight parts or less of carbon black may be mixed with the non-magnetic powder particles per 100 weight parts of the main non-magnetic powder particles to make it conductive. Further, $Cr_2O_3$, diamond, silicon nitride, SiC or the like having a greater particle size may be mixed with the main non-magnetic powder particles as an abrasive in an amount of 20 weight parts or less. The main non-magnetic powder particles need not necessarily be completely pure but the surface thereof may be treated with other inorganic compounds.

Specific examples of the non-magnetic powder particles to be used in the present invention include UA5600 and UA5605 manufactured by Showa Denko K.K., AKP-20, AKP-30, HIT-50, HIT-100 and ZA-G1 manufactured by Sumitomo Chemical Co., Ltd., TF-100, TF-120 and TF-140 manufactured by Toda Industry Co., Ltd., TT0-51B, TT0-55A, TT0-55B, TT0-55C, TT0-55S, TT0-55D, FT-1000, FT-2000, FTL-100, FTL-200, M-1, S-1 and SN-100 manufactured by Ishiwara Sangyo Kaisha Ltd., ECT-52, STT-4D, STT-30D, STT-30 and STT-65C manufactured by Titan Kogyo K.K., T-1 manufactured by Mitsubishi Metal Corporation, NS-0, NS-3Y, NS-8Y manufactured by Nippon Shokubai Kagaku Kogyo Co., Ltd., and the like.

The non-magnetic powder particles to be contained in the non-magnetic layer are preferably surface-treated with an organic substance in order to prevent the non-magnetic powder particles from adsorbing aliphatic acid to be added and to increase the amount of binder resin adsorbed onto the non-magnetic powder particles.

Specific examples of the organic substance to be used for surface-treatment include an organic acid having a pKa value of 3 or less, an epoxy-group-containing compound, a silane coupling agent, a titanate coupling agent and the like. Concrete compounds and treating methods are disclosed in Japanese Patent Application Laid Open No. 5-182178.

In the present invention, carbon black may be added to the non-magnetic layer used together with the main non-magnetic powder particles. I such a case, the carbon black can be furnace black for rubber, thermal black for rubber, black for color, acetylene black or the like. Such carbon black has a specific surface area of 100 to 500 m$^2$/g, preferably 150 to 400 m$^2$/g, and a DPB oil absorption of 20 to 400 ml/100 g, preferably 30 to 200 ml/100 g. The particle diameter of the carbon black is in the range of 5 to 80 $\mu$m, preferably 10 to 50 m$\mu$ and more preferably 10 to 40 m$\mu$. Preferably, the pH value of the carbon black is in the range of 2 to 10, the water content thereof is in the range of 0.1 to 10% and the tap density thereof is in the range of 0.1 to 1 g/cc. Specific examples of carbon black to be used together with the main non-magnetic powder particles in the present invention include BLACKPEARLS 2000, 1300, 1000, 900, 800, 880, 700, VULKAN and XC-72 manufactured by Cabot Co., Ltd., #3250B, #950B, #650B, #970B and #850B manufactured by Mitsubishi Chemical Industries Ltd., CONDUCTEX SC manufactured by Columbia Carbon Co., Ltd. and 8800, 8000,7000, 5750, 5250, 3500, 2100, 2000, 1800, 1500, 1255 and 1250 manufactured by RAVEN Co., Ltd., Ketjen Black EC manufactured by Agzo Co., Ltd. and the like. It is possible to use carbon blacks surface-treated with a dispersant or grafted with a resin or partially graphitized carbon blacks. These carbon blacks may be previously dispersed in a binder before being added to the non-magnetic coating solution. These carbon blacks may be used singly or in combination with other kinds of carbon blacks. Carbon black is preferably used in an amount of 0.1 to 30% by weight per 100% by weight of the main non-magnetic powder particles. Carbon black serves to inhibit the electrification of the non-magnetic layer, to provide a light screening effect to the magnetic recording medium and to enhance the film strength and the like. These functions depend on the kind of carbon black used. Therefore, in this invention, if one or more carbon blacks are used, it is preferable to select the kind, amount and combination of carbon blacks and to adjust the particle size, oil absorption, pH value and the like within the above described range in accordance with the purpose.

As regards carbon blacks which can be used in the present invention, reference can be made to, for example, "Handbook of Carbon Blacks," Carbon Black Kyokai.

In the present invention, abrasives may be contained not only in the magnetic layer but also in the non-magnetic layer.

In the present invention, the magnetic layer preferably contains carbon black whose average particle diameter is in the range of 50 to 300 m$\mu$. If the average particle diameter of the carbon black is smaller than 50 m$\mu$, the friction coefficient of the magnetic layer tends to increase. On the other hand, if the average particle diameter of the carbon black is greater than 300 m$\mu$, the surface properties of the magnetic layer tend to deteriorate, thereby lowering the electromagnetic conversion characteristics and increasing spacing loss.

Specific examples of carbon blacks to be used in the present invention include furnace black for rubber, thermal black for rubber, black for color, acetylene black and the like. The average primary particle size of the carbon black is preferably in the range of 50 to 300 m$\mu$, more preferably in the range of 70 to 280 m$\mu$. The specific surface area of the carbon black is preferably 5 to 500 m$^2$/g, and its DPB oil absorption is preferably in the range of 10 to 400 ml/100 g. Preferably, the pH value of the carbon black is in the range of 2 to 10, the water content thereof is in the range of 0.1 to 10% and the tap density thereof is in the range of 0.1 to 1 g/cc. It is possible to use carbon blacks surface-treated with a dispersant or grafted with a resin or partially graphitized carbon blacks.

These carbon blacks may be dispersed in a binder before being added to the magnetic coating solution. These carbon blacks may be used singly or in combination with other kinds of carbon blacks. Carbon black is preferably used in an amount of 0.1 to 30% by weight per 100% by weight of the magnetic powder particles. The carbon black to be contained in the magnetic layer is intended to reduce the friction coefficient of the magnetic layer, but it is possible to together use the carbon black which serves to provide a light screening effect to the magnetic recording medium and to enhance the film strength and the like. Further, carbon blacks having particle diameter smaller than that mentioned above may used together in accordance with the purpose.

As regards carbon blacks which can be used in the present invention, reference can be made to, for example, "Handbook of Carbon Blacks," Carbon Black Kyokai.

Binders to be incorporated in the magnetic layer and the non-magnetic layer according to the present invention include known thermoplastic resins, thermosetting resins reactive resins and the mixtures thereof.

Thermoplastic resins to be used in the present invention include those having a glass transition temperature of −100 to 150° C., a number-average molecular weight of 1,000 to 200,000, preferably 10,000 to 100,000 and a polymerization degree of about 50 to 1,000.

Examples of such thermoplastic resins include polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether or the like, polyurethane resins and various rubber resins.

Examples of the thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, a mixture of polyester resin and isocyanate prepolymer, a mixture of polyester polyol and polyisocyanate, and a mixture of polyurethane and polyisocyanate and the like.

These resins are described in detail in "Plastic Handbook," Asakura Shoten. Further, known electron radiation curing resins can be incorporated into either the non-magnetic layer or the magnetic layer. Examples of these resins and their preparation methods are described in detail in Japanese Patent Application Laid Open No. 62-256219.

These resins can be used singly or in combination. Preferred examples of resin combinations include a combination of at least one resin selected from the group consisting of vinyl chloride resin, vinyl chloride-vinyl acetate resin, vinyl chloride-vinyl acetate-vinyl alcohol resin, vinyl chloride-vinyl acetate-maleic anhydride copolymer with a polyurethane resin, and a combination thereof with polyisocyanate.

Examples of the structure of polyurethane resins include known structures such as polyester polyurethane, polyether polyurethane, polyether polyester polyurethane, polycarbonate polyurethane, polyester poly carbonate polyurethane and polycaprolactone polyurethane and the like.

Among these binders, those in which at least one polar group selected from COOM, $SO_3M$, $OSO_3M$, $P=O$, $(OM)_2$, OH, $NR_2$, $N^+R_3$ (in which R represents a hydrocarbon group), epoxy group, SH, CN and the like has been introduced by copolymerization or addition reaction may be optionally used to obtain better dispersibility and durability. The amount of such a polar group is in the range of about $10^{-1}$ to $10^{-8}$ mole/g, preferably $10^{-2}$ to $10^{-6}$.

Specific examples of these binders to be used in the present invention include VAGH, VYHH, VMCH, VAGF, VAGD, VROH, VYES, VYNC, VMCC, XYHL, XYSG, PKHH, PKHJ, PKHC and PKFE manufactured by Union Carbide Co., Ltd.; MPR-TA, MPR-TA5, MPR-TAL, MPR-TSN, MPR-TMF, MPR-TS and MPR-TM manufactured by Nisshin Chemical Industry Co., Ltd.; 1000W, DX80, DX81, DX82 and DX83 manufactured by Electro Chemical Industrial Co., Ltd.; MR110, MR100 and 400X110A manufactured by Nippon Zeon Co., Ltd.; Nippolan N2301, N2302 and N2304 manufactured by Nippon Polyurethane Co., Ltd.; Pandex T-5105, T-R3080 and T-5201, Barnock D400 and D-210-80, and Crisvon 6109 and 7209 manufactured by Dainippon Ink and Chemicals Inc.; Vylon UR8200, UR8300, RV530, RV280, UR8600 and UR5500 manufactured by Toyobo Co., Ltd.; Daipheramine 4020, 5020, 5100, 5300, 9020, 9022 and 7020 manufactured by Dainichi Seika Co., Ltd.; MX5004 manufactured by Mitsubishi Chemical Industries Ltd.; Sunprene SP-150 manufactured by Sanyo Chemical Industries Co., Ltd.; and Salan F310 and F210 manufactured by Asahi Chemical Industry Co., Ltd. and the like.

In the present invention, the content of the binders in the magnetic layer and the non-magnetic layer is preferably in the range of 5 to 50% by weight and more preferably 10 to 30% by weight based on the total weight of the ferromagnetic powder particles contained in the magnetic layer and the non-magnetic powder particles contained in the non-magnetic layer. If a vinyl chloride resin is to be used, its content is preferably in the range of 5 to 30% by weight. If a polyurethane resin is to be used, its content is preferably in the range of 2 to 20% by weight. If a polyisocyanate resin is to be used, its content is preferably in the range of 2 to 20% by weight. These binder resins are preferably used in these amounts in combination.

If a polyurethane resin is to be used as a binder in the present invention, its glass transition temperature, breaking extension, breaking stress and yield point are preferably in the ranges of −50 to 100° C., 100 to 2,000%, 0.05 to 10 Kg/cm$^2$ and 0.05 to 10 Kg/cm$^2$.

If a non-magnetic layer is provided in the present invention, the amount of the binder, the amount of vinyl chloride resin, polyurethane resin, polyisocyanate or other resins to be contained in the binder, the molecular weight of resins constituting the magnetic layer, the amount of polar group, the physical properties of the above mentioned resins can be altered between the non-magnetic layer and the magnetic layer as is necessary.

Examples of isocyanates which can be used in the present invention include isocyanates such as tolylenediisocyanate, 4-4'-diphenylmethane diisocyanate, hexmethylene diisocyanate, xylene diisocyanate, naphthylene-1,5-diisocyanate, o-toluidine diisocyanate, isophorone diisocyanate, triphenylmethane triisocyanate and like, products of the reaction of these isocyanates with polyalcohols, and polyisocyanates produced by the condensation of isocyanates. Specific examples of these isocyanates include Coronate L, Coronate-HL, Coronate-2030, Coronate-2031, Millionate-MR and Millionate-MTL manufactured by Nippon Polyurethane Co., Ltd.; Takenate D-102, Takenate D-110N, Takenate D-200 and Takenate D-202 manufactured by Takeda Chemical Industries, Co., Ltd.; Desmodur L, Desmodur IL, Desmodur N and Desmodur HL manufactured by Sumitomo Bayer Co., Ltd. and the like. These isocyanates may be used singly. Alternatively, by making the best use of the difference in their hardening reactivity, two or more of these isocyanates may be used in combination in both the magnetic layer and the non-magnetic layer.

In the present invention, the magnetic layer or the non-magnetic layer preferably contains higher aliphatic acid for improving the running durability. The higher aliphatic acid to be contained in the magnetic layer or the non-magnetic layer is mainly monobasic aliphatic acid with 10 to 26 carbon atoms and may be saturated or unsaturated. Further, it may be linear or branched. A carbon to which a carboxyl group is bonded may be any one of a primary, secondary and tertiary carbon. Specific examples of these higher aliphatic acids include lauric acid, palmitic acid, myristic acid, stearic acid, behenic acid, oleic acid, linolenic acid, elaidic acid and the like. The amount of higher aliphatic acid to be contained in the non-magnetic layer is 0.1 to 20% by weight, preferably 0.1 to 10% by weight and more preferably 0.1 to 5% by weight on the basis of the non-magnetic powder particles (which is all non-magnetic powder particles, if two or more kinds of the non-magnetic powder particles are used). The amount of higher aliphatic acid to be contained in the magnetic layer is 0.1 to 20% by weight, preferably 0.1 to 10% by weight and more preferably 0.1 to 5% by weight on the basis of the ferromagnetic powder particles.

Further, in the present invention, additives such as a dispersant, lubricant, antistatic agent, surface active agent, plasticizer and the like may be used in accordance with the purpose. The additives to be used in the present invention can be those having a lubricating effect, an antistatic effect, a dispersing effect, a plasticizing effect and so on. For example, molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluoride-containing ester, polyolefin, polyglycol, ester alkylphosphate and alkaline metal salt thereof, ester, ester alkylsulfate and alkaline metal salt thereof, polyphenyl ether, fluorine-containing ester alkylsulfate and alkaline metal salt thereof, monovalent, divalent, trivalent, tetravalent, pentavalent and hexavalent alcohol with 12 to 22 carbon atoms (which may contain an unsaturated bond or may be branched), alkoxy alcohol with 12 to 22 carbon atoms, monoaliphatic acid ester, dialiphatic acid ester or trialiphatic acid ester consisting of a higher aliphatic acid with 12 to 22 carbon atoms (which may contain an unsaturated bond or may be branched) and one of monovalent, divalent, trivalent, tetravalent, pentavalent and hexavalent alcohol with 2 to 12 carbon atoms (which may contain an unsaturated bond or may be branched), aliphatic ester of monoalkyl ether of alkylene oxide polymer, aliphatic amide with 8 to 22 carbon atoms, aliphatic amine with 8 to 22 carbon atoms, aliphatic acid ester (which may contain an unsaturated bond or may be branched) consisting of aliphatic acid with 10 to 24 carbon atoms and alcohol and the like can be used. Specific examples of such additives include stearic acid amide, myristic acid amide, butyl stearate, oleyl oleate, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. Further, non-ionic surface active agents such as alkylene oxide, glycerin, glycidol and alkylphenolethylene oxide addition product and the like; cationic surface active agents such as cyclic amine, ester amide, quaternary ammonium salt, hydantoin derivative, heterocyclic compound, phosphonium and sulfonium and the like; anionic surface active agents containing polar groups such as carboxylic acid, sulfonic acid, phosphoric acid, ester sulfate, ester phosphate and the like; amphoteric surface active agents such as amino acid, aminosulfonic acid, sulfuric or phosphoric ester of amino alcohol, alkylbetaine and the like, can be used. These surface active agents are described in detail in "Kaimen Kasseizai Binran (Handbook of Surface Active Agents)," Sangyo Tosho K.K. These additives, including dispersants, lubricants, antistatic agents, surface active agents, plasticizers and the like, need not necessarily be 100% pure, but may contain impurities such as isomer, unreacted material, by-product, decomposition product, oxide and the like. The concentration of these impurities is preferably 30% by weight or less, more preferably 10% by weight or less.

Additives such as dispersants, lubricants, antistatic agents, surface active agents, plasticizers and the like to be used in the present invention may be varied in their kind and content between the non-magnetic layer and the magnetic layer as is necessary. For example, aliphatic acids may be varied in their melting points between the non-magnetic layer and the magnetic layer to control the oozing thereof to the surface and esters may be varied in their boiling points or polarity between the non-magnetic layer and the magnetic layer to control the oozing thereof to the surface. Further, the content of surface active agents may be controlled to improve the coating stability and the content of lubricants may be higher in the intermediate layer to improve the lubricating effect. It goes without saying that additives such as dispersants, lubricants, antistatic agents, surface active agents, plasticizers and the like can be varied in their kind and content between the non-magnetic layer and the magnetic layer in different ways from the above for other purposes.

The additives to be used in the present invention may be entirely or partially added to the system at any step during the preparation of the magnetic coating solution. For example, these additives may be mixed with the ferromagnetic powder particles before kneading. Further, these additives may be added to the system at the step of kneading ferromagnetic powder particles with a binder and a solvent. Alternatively, these additives may be added to the system during or after the dispersion step or immediately before the coating step. Specific examples of lubricants to be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil hardened aliphthatic acid, NAA-42, NAA44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S4, Nonion O-2, Nonion LP-20R, Nonion PP-40R, Nonion SP-60R, Nonion OP-80R, Nonion OP-85R, Nonion LT-221, Nonion OT-221, Monogly MB, Nonion DS-60, Anon BF, Anon LG, butyl stearate, butyl laurate, and erucic acid manufactured by Nippon Oils and Fats Co., Ltd.; oleic acid manufactured by Kanto Chemicals Co., Ltd.; FAL-205 and FAL-123 manufactured by Takemoto Yushi Co., Ltd.; Enujerubu LO, Enujerubu IPM and Sansosyzer E4030 manufactured by Shin Nihon Rika Co., Ltd.; TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 manufactured by The Shin-Etsu Chemical Co., Ltd.; Armide P, Armide C and Armoslip CP manufactured by Lion Armor Co., Ltd.; Duomine TDO manufactured by Lion Fat and Oil Co., Ltd.; BA-41G manufactured by The Nisshin Oil Mills Co., Ltd.; Profan 2012E, Newpole PE61, Ionet MS-400, Ionet MO-200, Ionet DL-200, Ionet DS-300, Ionet DS-1000, and Ionet DO-200 manufactured by Sanyo Chemical Co., Ltd. and the like.

Examples of organic solvents to be used in the present invention include ketones such as acetone, methyl ethyl ketone, methyl isobutyl ketone, diisobutyl ketone, cyclohexanone, isophorone, tetrahydrofuran and the like; alcohols such as methanol, ethanol, propanol, butanol, isobutyl alcohol, isopropyl alcohol, methyl cyclohexanol and the like; esters such as methyl acetate, butyl acetate, isobutyl acetate, isopropyl acetate, ethyl butyrate, glycol acetate and the like; glycol ethers such as glycol dimethyl ether, glycol monoethyl ether, dioxane and the like; aromatic hydrocarbons such as benzene, toluene, xylene, cresol, chlorobenzene and the like; chlorinated hydrocarbons such as methylene chloride, ethylene chloride, carbon tetrachloride, chloroform, ethylene chloro-hydrin, dichlorobenzene and the like; N,N-dimethylformamine; hexane and the like. These organic solvents may be used in any proportion. These organic solvents need not necessarily be 100% pure and may contain impurities such as isomers, unreacted materials, by-products, decomposition products, oxides, water content and the like besides the main components. The content of these impurities is preferably 30% by weight or less and more preferably 10% by weight or less. Organic solvents to be used in the present invention may be varied in their kind and content between the magnetic layer and the non-magnetic layer as is necessary. For example, a solvent having a high volatility may be used for the magnetic layer to improve the surface properties while a solvent having a high surface tension may be used for the non-magnetic layer to enhance the coating stability. Further, a solvent having a high solubility parameter may be used for the magnetic layer to improve the packing ability. These are merely examples and the present invention is not limited to these examples.

The thickness of a non-magnetic support for the magnetic recording medium according to the present invention is preferably in the range of 1 to 100 $\mu$m and more preferably 2 to 80 $\mu$m. The thickness of the non-magnetic layer is preferably in the range of 0.1 to 10 $\mu$m and more preferably 0.5 to 5 $\mu$m. The thickness of the magnetic layer is preferably in the range of 0.05 to 4.0 $\mu$m and preferably 0.1 to 1.0 $\mu$m. If the non-magnetic layer is provided, it is most preferable for the thickness of the magnetic layer to be in the range of 0.1 to 0.8 $\mu$m. The total thickness of the magnetic layer and the non-magnetic layer is preferably in the range of $\frac{1}{100}$ to two times the thickness of the non-magnetic support. An undercoating layer is preferably provided between the non-magnetic support and the non-magnetic layer to enhance the adhesion therebetween. The thickness of the undercoating layer is in the range of 0.01 to 2 µm and preferably 0.05 to 0.5 µm. A back coating layer may be provided on the non-magnetic support on the opposite side from the magnetic layer. The thickness of the back coating layer is in the range of 0.1 to 2 µm and preferably 0.3 to 1.0 µm. The undercoating layer and the back coating layer can be formed of known materials.

The non-magnetic support to be used in the present invention can be any known film such as polyester, e.g., polyethylene terephthalate, polyethylene naphthalate and the like; polyolefin; cellulose triacetate; polycarbonate; polyamide; polyimide; polyamideimide; polysulfon, aramide, aromatic polyamide and the like. Such a support may be previously subjected to corona discharge, plasma treatment, easy adhesion treatment, heat treatment, dust removing treatment and the like. In order to accomplish the object of the present invention, it is preferable to use a non-magnetic support having a center-line average surface roughness of 0.001 to 0.03 µm, more preferably 0.001 to 0.02 µm and most preferably 0.001 to 0.01 µm. Such a non-magnetic support preferably not only has a small average surface roughness on the center line, but also no big protrusions measuring 1 µm or more. The surface roughness may be freely controlled by the particle size and amount of filler to be incorporated into the support as is necessary. Examples of the filler include oxide and carbonate of Ca, Si, Ti and the like, and finely divided powders of organic material such as acryl.

The non-magnetic support to be used in the present invention preferably exhibits a tape running direction and width direction heat shrinkage of 3% or less, more preferably 1.5% or less at 100° C. for 30 minutes and 1% or less, more preferably 0.5% or less at 80° C. for 30 minutes. The breaking strength of the non-magnetic support is preferably in the range of 5 to 100 Kg/mm$^2$ in both directions. The elastic modulus thereof is preferably in the range 100 to 2,000 Kg/mm$^2$ in both directions.

The process for preparing the magnetic solution for constituting the magnetic layer of the magnetic recording medium according to the present invention comprises at least a kneading step, a dispersion step, and a mixing step which is optionally effected before or after these steps. Each of these steps may consist of two or more stages. The raw materials to be used in the present invention such as ferromagnetic powder particles, binders, carbon blacks, abrasives, antistatic agents, lubricants, solvents and the like may be added to the system at the beginning of or during any step. Each of these raw materials may be added to the system at two or more steps. For example, polyurethane may be charged into the system at the kneading step, dispersing step and mixing step for viscosity adjustment after dispersion.

In the present invention, known manufacturing techniques can be used for manufacturing the magnetic recording medium. As a kneading apparatus, an open kneader, a continuous kneader, a pressure kneader or the like can be used. During kneading, the ferromagnetic powder particles or non-magnetic powder particles are kneaded with the whole or part of the binder (preferably 30% by weight or more of the total weight of all binders) in an amount of 15 to 500 parts by weight based on 100 parts by weight of ferromagnetic powder particles or non-magnetic powder particles. These kneading treatments are described in detail in Japanese Patent Laid Open Nos. 1-106338 and 64-79274.

In the present invention, a gravure coating method, roll coating method, blade coating method, extrusion coating method or the like that is normally used for applying a magnetic coating solution can be used for providing the magnetic layer on the non-magnetic support.

In the present invention, examples of methods for providing the non-magnetic layer and the magnetic layer on the non-magnetic support include a method for applying the magnetic layer by means of a support pressure type extrusion coating apparatus as disclosed in Japanese Patent Publication No. 1-46186, Japanese Patent Application Laid Open Nos. 60-238179 and 2-265672 after applying the non-magnetic layer by means of a gravure coating apparatus, roll coating apparatus, blade coating apparatus, extrusion coating apparatus or the like that is normally used for applying a magnetic coating solution and drying it, a method for applying the magnetic layer by means of a support pressure type extrusion coating apparatus as disclosed in Japanese Patent Publication No. 1-46186, Japanese Patent Application Laid Open Nos. 60-238179 and 2-265672 after applying the non-magnetic layer by means of a gravure coating apparatus, roll coating apparatus, blade coating apparatus, extrusion coating apparatus or the like and while the non-magnetic is still wet, a method for applying the magnetic layer and the non-magnetic layer almost simultaneously by means of a single coating head having two slits for coating solutions as disclosed in Japanese Patent Application Laid open Nos. 63-88080, 2-17971 and 2-265672, a method for applying the magnetic layer and the non-magnetic layer almost simultaneously by means of an extrusion coating apparatus with a backup roller as disclosed in Japanese Patent Application Laid Open No. 2-174965 or the like. Among these methods, it is preferable to employ the method for providing the magnetic layer on the non-magnetic layer while the latter is still wet and is more preferable to employ the method for almost simultaneously providing the non-magnetic layer and the magnetic layer on the non-magnetic support.

In the present invention, two or more magnetic layers can provided in a similar manner.

In the present invention, as a calendering roller for orientation, there can be used a roller made of heat-resistant plastic such as epoxy, polyimide, polyamide, polyimideamide or the like. Alternatively only metallic rollers can be used in combination for orientation. The calender processing temperature is preferably in the range of 70 to 150° C., more preferably 80 to 150° C. The linear pressure is preferably in the range of 200 to 500 Kg/cm, more preferably 300 to 400 Kg/cm.

The magnetic recording medium of the present invention preferably exhibits a frictional coefficient of 0.5 or less, more preferably 0.3 or less, with respect to SUS420J on the surface of the magnetic layer and the opposite surface thereto. The magnetic layer preferably has an inherent surface resistivity of $10^{-5}$ to $10^{-12}$ Ω/sq. The magnetic layer preferably exhibits an elasticity of 100 to 2,000 Kg/mm$^2$ at 5% elongation in both its web running direction and its width direction and the breaking strength thereof is preferably in the range of 1 to 30 Kg/cm$^2$. The elasticity of the magnetic recording medium is preferably in the range of 100 to 1,500 Kg/m$^2$ in both the web running direction and the width direction and the residual elongation thereof is preferably in the range of 0.5% or less. The heat shrinkage of the magnetic recording medium at all temperatures at and below 100° C. is preferably 1% or less, more preferably 0.5% or less and most preferably 0.1% or less.

In the present invention, the elasticity of the magnetic layer is preferably in the range of 100 to 2,000 Kg/mm$^2$ in the longitudinal direction and the width direction, and that of the non-magnetic layer is preferably in the range of 100 to 2,000 Kg/mm$^2$ in the longitudinal direction and the width direction. However, the elasticity of the magnetic layer and the non-magnetic layer may be varied in accordance with the purposes.

In the present invention, the amount of residual solvents contained in the magnetic layer and the non-magnetic layer is preferably in the range of 100 mg/m$^2$ or less, more preferably 10 mg/m$^2$ or less.

In the present invention, the magnetic layer and the non-magnetic layer preferably has voids at 30% by volume or less, more preferably 10% by volume or less.

Among the magnetic characteristics of the magnetic recording medium of the present invention, the squareness ratio measured under a magnetic field of 10 KOe is preferably in the range of 0.70 or more and more preferably 0.80 or more in the orientation direction.

In the present invention, in the case where the magnetic recording medium comprises two or more layers, namely, where it comprises one non-magnetic layer and one magnetic layer, one non-magnetic layer and two or more magnetic layers, two or more non-magnetic layers and one magnetic layer, or two or more non-magnetic layers and two or more magnetic layers, it will readily be understood that the physical properties of the individual layer may be different. For example, the elasticity of the non-magnetic layer can be increased to improve the running durability, while the elasticity of the magnetic layer can be made lower than that of the non-magnetic layer to improve the contact of the magnetic recording medium with the head.

DESCRIPTION OF THE PREFERRED EMBODIMENTS

Figure 1:
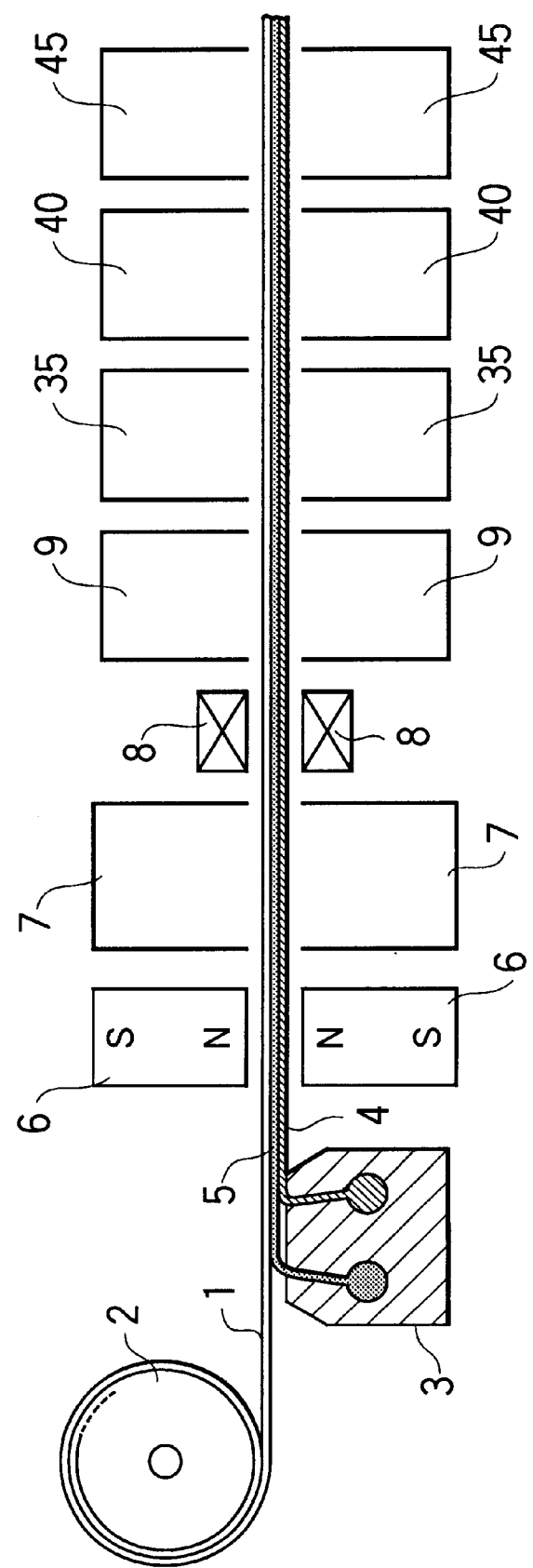
FIG. 1 is a schematic front view showing an apparatus for manufacturing a magnetic recording medium which is an embodiment of the present invention.

As shown in FIG. 1, a web-like non-magnetic support 1 is fed from a feeding roll 2 and an upper magnetic coating solution containing magnetic powder particles and a lower non-magnetic coating solution are simultaneously applied onto the surface of the non-magnetic support 1, whereby an upper magnetic layer 4 and a lower non-magnetic layer 5 are formed.

Then, a magnetic field is applied to the upper magnetic layer 4 and the lower non-magnetic layer 5 in the longitudinal direction of the non-magnetic support 1 by a pair of permanent magnets 6, 6 disposed so that N poles thereof face each other and the magnetic powder particles contained in the upper magnetic layer 4 are oriented in the transporting direction of the non-magnetic support 1, namely, the longitudinal direction of the non-magnetic support 1.

This orientation in the longitudinal direction is effected under a magnetic field having a strength preferably equal to or higher than double the coercive force of the magnetic powder particles and equal to or less than 15000 Oe and more preferably equal to or higher than triple the coercive force of the magnetic powder particles and equal to or less than 10000 Oe. Further, the magnetic field is preferably applied to the magnetic powder particles for a period in the range of 3 milliseconds to 100 milliseconds and more preferably 6 milliseconds to 100 milliseconds.

Then, the upper magnetic layer 4 in which the magnetic powder particles have been oriented in the longitudinal direction of the non-magnetic support 1 and the lower non-magnetic layer 5 are preliminarily dried by a first drier device 7 and after the magnetic powder particles have been again oriented in the longitudinal direction of the non-magnetic support 1 by a solenoid coil 8, the upper magnetic layer 4 and the lower non-magnetic layer 5 are fed to an oblique orienting device 9.

The drying conditions in the first drier device 7 are set so that, preferably, the amount of residual solvents in the upper magnetic layer 4 and the lower non-magnetic layer 5 at the exit of the first drier device 7 is 50 to 90% by weight per 100% by weight of the total amount of organic solvents contained in the upper magnetic layer 4 and the lower non-magnetic layer 5 and more preferably 60 to 80% by weight.

The strength of the magnetic field generated by the solenoid coil 8 is preferably in the range of equal to or greater than the coercive force of the magnetic powder particles and equal to or less than 10000 Oe and more preferably equal to or greater than 1.5 times the coercive force of the magnetic powder particles and equal to or less than 8000 Oe.

Although the magnetic powder particles in the upper magnetic layer 4 have been oriented by the pair of permanent magnets 6, 6, the orientation thereof may be changed from the longitudinal direction by the magnetic repulsion force among the magnetic powder particles. However, since the magnetic powder particles are again oriented by the solenoid coil 8, all magnetic powder particles are oriented in the longitudinal direction of the non-magnetic support 1.

Figure 2:
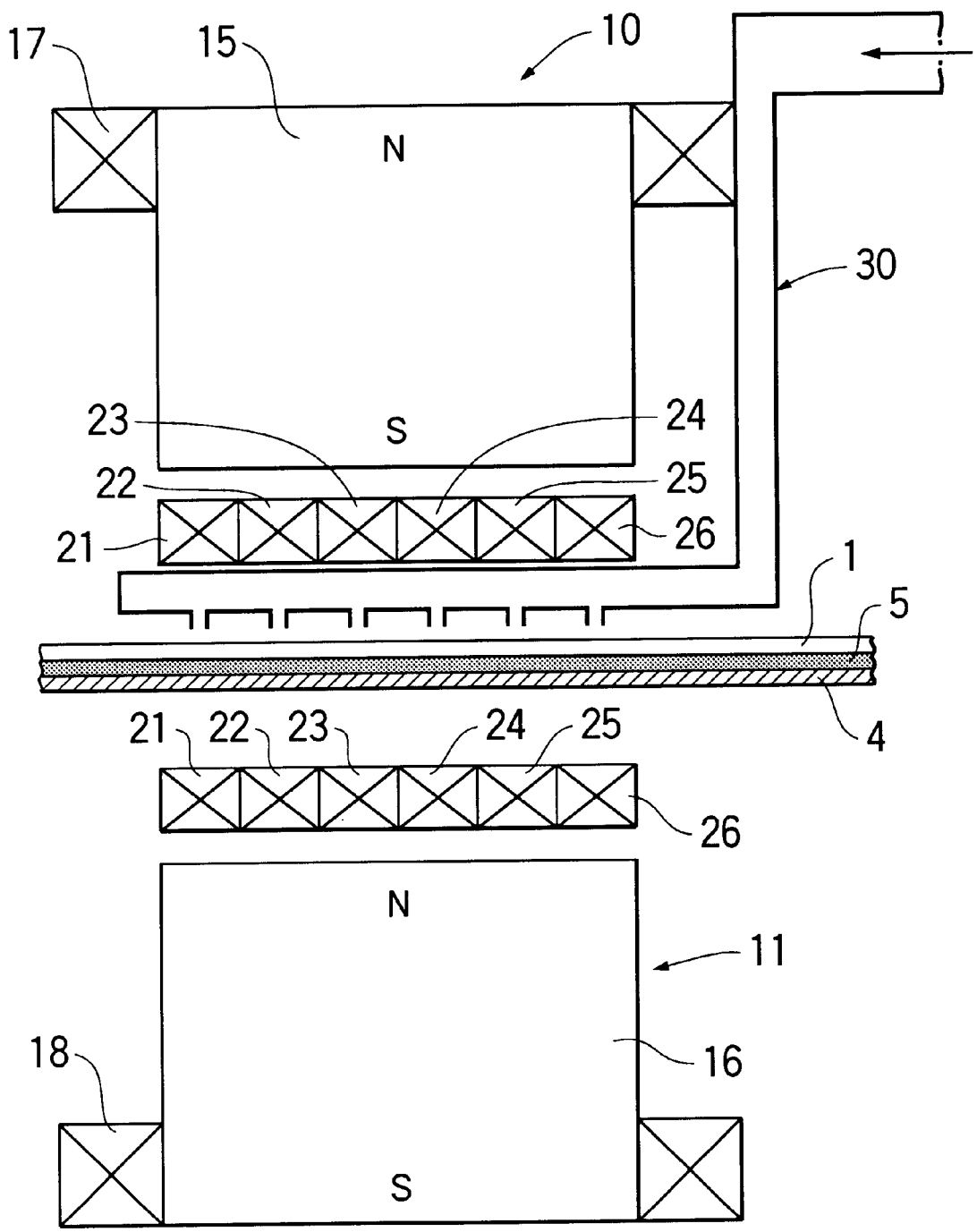
FIG. 2 is a schematic cross-sectional view showing an oblique orienting device.

FIG. 2 is a schematic cross-sectional view showing the oblique orienting device 9.

As shown in FIG. 2, the oblique orienting device 9 includes a pair of first magnets 10, 11 and six second magnets 21, 22, 23, 24, 25, 26.

The first magnets 10, 11 include magnetic cores 15, 16, which are, for example, iron cores having a rectangular cross-section, and coils 17, 18 of a predetermined number of windings disposed around the magnetic cores 15, 16. A direct current source (not shown) is connected to the coils 17, 18. The lengths of the facing surfaces of the magnetic cores are sufficient for completing the orientation of the magnetic powder particles contained in the upper magnetic layer 4 in the longitudinal direction of the non-magnetic support 1. The first magnets 10, 11 form a magnet field perpendicular to the surface of the upper magnetic layer 4 and the lower non-magnetic layer 5.

Each of the second magnets 21, 22, 23, 24, 25, 26 is constituted of a solenoid coil and is connected to a different direct current source (not shown) so as to form a magnetic field parallel to the surface of the upper magnetic layer 4 and the lower non-magnetic layer 5 and at a strength proportional to the current supplied by the direct current source.

Since a magnetic field perpendicular to the surface of the upper magnetic layer 4 is generated by the pair of first magnets 10, 11 and a magnetic field parallel to the surface of the upper magnetic layer 4 is generated by each of the second magnets 21, 22, 23, 24, 25, 26, a magnetic field whose direction and strength corresponds to the vector sum of these magnetic fields is applied to the upper magnetic layer 4. Therefore, the angle that the magnetic field applied to the upper magnetic layer 4 makes with respect to the transporting direction of the non-magnetic support 1 in a plane perpendicular to the surface of the upper magnetic layer 4 and parallel to the transporting direction of the non-magnetic support 1 can be increased in six stages by controlling the currents supplied to the solenoid coils constituting the second magnets 21, 22, 23, 24, 25, 26 so that the current supplied to the solenoid of an upstream second magnets relative to the transporting direction of the non-magnetic support 1 is greater than the current supplied to the solenoid of a downstream second magnets. As a result, the magnetic powder particles in the upper magnetic layer 4 can be oriented to the final desired angle by the last second magnet 26 in the downstream direction.

Since the magnetic powder particles in the upper magnetic layer 4 which have been oriented in the longitudinal direction of the non-magnetic support 1 by the pair of permanent magnets 6, 6 are fed to the oblique orienting device 9, the magnetic powder particles are pivoted and oriented by the magnetic field applied by the oblique orienting device 9. Further, the magnetic powder particles are first slightly oriented from the longitudinal direction of the non-magnetic support 1 in an oblique direction by a magnetic field whose direction and strength are the vector sum of the magnetic field generated by the pair of first magnets 10, 11 perpendicular to the surface of the upper magnetic layer 4 and the magnetic field generated by the second magnet 21 parallel to the surface of the upper magnetic layer 4. Then the magnetic powder particles are further slightly oriented in the oblique direction by a magnetic field whose direction and strength are the vector sum of the magnetic field generated by the pair of first magnets 10, 11 perpendicular to the surface of the upper magnetic layer 4 and the magnetic field generated by the second magnet 22 parallel to the surface of the upper magnetic layer 4. This process is repeated at successive second magnets until, finally, the magnetic powder particles are further slightly oriented to the desired angle by a magnetic field whose direction and strength are the vector sum of the magnetic field generated by the pair of first magnets 10, 11 perpendicular to the surface of the upper magnetic layer 4 and the magnetic field generated by the second magnet 26 parallel to the surface of the upper magnetic layer 4. Therefore, since the change in the direction of the magnetic powder particles caused by the vector sum of the magnetic field generated by the pair of first magnet 10, 11 and the magnetic field generated by each of the second magnets 21, 22, 23, 24, 25, 26 is slight, the magnetic powder particles are gradually and reliably oriented in the oblique direction by each of the magnetic fields and finally to the desired angle.

The strength of the magnetic field generated by the oblique orienting device 9 is preferably equal to or greater than the coercive force of the magnetic powder particles and equal to or less than 10000 Oe and more preferably equal to or greater than 1.5 times the coercive force of the magnetic powder particles and equal to or less than 8000 Oe.

A drier means 30 is provided in the oblique orienting device 9 for blowing dry air, heated air or the like onto the upper magnetic layer 4 and the lower non-magnetic layer 5 and, therefore, the magnetic powder particles contained in the upper magnetic layer 4 are oriented while the upper magnetic layer 4 and the lower non-magnetic layer 5 are being dried by dry air, heated air or the like blown from the drier means 30. When the magnetic powder particles contained in the upper magnetic layer 4 are oriented while the upper magnetic layer 4 and the lower non-magnetic layer 5 are being dried by dry air, heated air or the like blown from the drier means 30, the oriented magnetic powder particles are fixed by drying in the upper magnetic layer 4 and change in the direction of the magnetic powder particles due to the magnetic repulsion force among the magnetic powder particles can be prevented, thereby enabling efficient orientation of the magnetic powder particles.

The time period of applying the magnetic field to the upper magnetic layer 4 is set to that required for the drier means 30 to reduce the amount of residual solvents in the upper magnetic layer 4 and the lower non-magnetic layer 5 at the exit of the oblique orienting device 9 to, preferably, 0 to 50% by weight per 100% by weight of the total amount of organic solvents contained in the upper magnetic layer 4 and the lower non-magnetic layer 5 and, more preferably, to 10 to 30% by weight. The actual time period depends on the transporting speed of the non-magnetic support 1 and is preferably 0.1 to 10 seconds and more preferably 0.2 to 5 seconds.

After the orientation has been effected in this manner, the upper magnetic layer 4 and the lower non-magnetic layer 5 are finally dried by a second drier device 35. The upper magnetic layer 4 and the lower non-magnetic layer 5 are then subjected to calendered by a calendering device 40 and cut by a slitter 45, thereby producing magnetic recording media.

According to this embodiment, magnetic fields are generated by the pair of first magnets 10, 11 and the second magnets 21, 22, 23, 24, 25, 26 in the oblique orienting device 9 so that the angle of the vector sum thereof to the transporting direction of the non-magnetic support 1 in a plane perpendicular to the surface of the upper magnetic layer 4 and parallel to the transporting direction of the non-magnetic support 1 gradually increases in six stages and the magnetic powder particles in the upper magnetic layer 4 are gradually oriented to the desired angle. Since the magnetic powder particles are therefore only slightly reoriented in the oblique direction by each of the magnet fields, the magnetic powder particles can be reliably oriented in the oblique direction, whereby a magnetic recording medium having an excellent squareness ratio in which the magnetic powder particles are uniformly oriented at the desired oblique angle can be manufactured using less energy than in the prior art.

Further, according to this embodiment, after the magnetic powder particles in the upper magnetic layer 4 are oriented in the longitudinal direction of the non-magnetic support 1 by the pair of permanent magnets 6, 6 and then further oriented in the longitudinal direction of the non-magnetic support 1 by the solenoid coil 8, they are fed into the oblique orienting device 9 and subjected to oblique orientation. Since the individual magnetic powder particles are therefore oriented under the same condition, the magnetic powder particles are more uniformly oriented to the desired oblique angle and a magnetic recording medium having an excellent squareness ratio can be manufactured.

Figure 3:
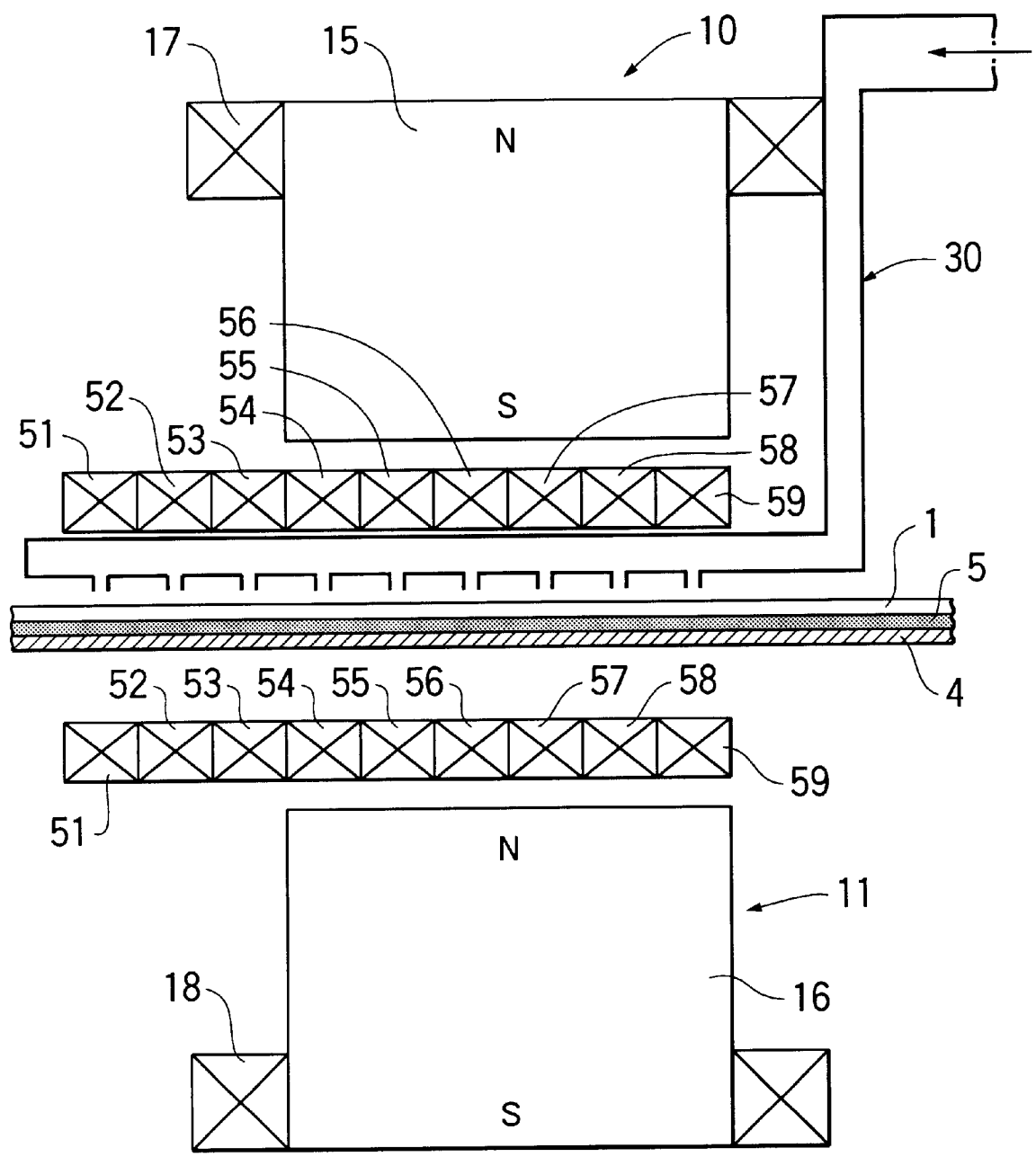
FIG. 3 is a schematic view showing an oblique orienting device of an apparatus for manufacturing a magnetic recording medium which is another embodiment of the present invention.

FIG. 3 shows an oblique orienting device used in an apparatus for manufacturing a magnetic recording medium which is another embodiment of the present invention.

As shown in FIG. 3, the oblique orienting device 9 includes first magnets 10, 11 for generating a magnetic field perpendicular to the surface of the upper magnetic layer 4 and second magnets 51, 52, 53, 54, 55, 56, 57, 58, 59 disposed so as to extend upstream of the first magnets 10, 11 relative to the transporting direction of the non-magnetic support 1 and constituted of solenoid coils for generating a magnetic field parallel to the surface of the upper magnetic layer 4.

Since according to this embodiment, the solenoid 8 in the previous embodiment can be omitted it is possible to manufacture a magnetic recording medium in which the magnetic powder particles are oriented to the desired oblique angle with an apparatus of compact configuration. More specifically, even if the magnetic powder particles contained in the upper magnetic layer 4 and oriented in the longitudinal direction by the pair of permanent magnets 6, 6 should deviate from the longitudinal direction during the first drying process effected by the first drier device 7 due to the magnetic repulsion force among them, the magnetic powder particles are again oriented to the longitudinal direction by the second magnets 51, 52, 53 constituted of solenoid coils and disposed so as to extend upstream relative to the transporting direction of the non-magnetic support 1 and then gradually and slightly oriented toward the desired oblique angle by the vector sum of the magnetic field generated by the first magnets 10, 11 and each of the second magnets 54, 55, 56, 57, 58, 59. It is therefore possible to prevent reduction in the orientation efficiency caused by change in the direction of the magnetic powder particles due to the magnetic repulsion force among the magnetic powder particles and to manufacture a magnetic recording medium having an excellent squareness ratio.

EXAMPLES

Examples will now be described to clarify the effects of the present invention. In the Examples, "parts" means "part by weight."

Example 1

Magnetic recording media were manufactured using the apparatus for manufacturing a magnetic recording medium shown in FIGS. 1 and 2.

A magnetic coating solution for an upper magnetic layer and a non-magnetic coating solution for a lower non-magnetic layer having the following compositions were simultaneously applied onto the surface of a web-like polyethylene terephthalate film having a width of 500 mm and a thickness of 10 μm using an extrusion-type simultaneous multiple coating device having two slits so that the dried thickness of the upper magnetic layer would be 0.2 μm and that of the lower non-magnetic layer would be 1.5 μm, thereby forming the upper magnetic layer and the lower non-magnetic layer.

| Magnetic coating solution for upper magnetic layer | |
|---|---|
| Fe/Zn/Ni (weight ratio 92:4:4) powder particles (acicular particles having an average diameter of 0.10 m in a long axis; long axis/short axis = 5; coercive force: 2000 Oe) | 300 parts |
| Vinyl chloride-vinyl acetate copolymer (copolymerization ratio: 87:13; polymerization degree: 4000 | 30 parts |
| Carbon black | 20 parts |
| Polyamide resin (amine value: 300) | 15 parts |
| Lecithin | 6 parts |
| Silicone oil (dimethyl polysiloxane) | 3 parts |
| Cyclohexane | 300 parts |

| -continued | |
|---|---|
| Methyl ethyl ketone | 300 parts |
| N-butanol | 100 parts |

| Non-magnetic coating solution for lower non-magnetic layer | |
|---|---|
| $TiO_2$ (average primary particle diameter: 0.05 m; specific surface area by BET method: 18 m$^2$/g) | 80 parts |
| Vinyl chloride-vinyl acetate copolymer (copolymerization ratio: 87:13; polymerization degree: 400) | 30 parts |
| Carbon black | 20 parts |
| Polyamide resin (amine value: 300) | 15 parts |
| Lecithin | 6 parts |
| Silicone oil (dimethyl polysiloxane) | 3 parts |
| Cyclohexane | 500 parts |
| N-butanol | 100 parts |

A magnetic field of 7500 Oe was applied onto the upper magnetic layer and the lower non-magnetic layer by a pair of permanent magnets disposed with their N poles facing each other, thereby orienting the magnetic powder particles contained in the upper magnetic layer in the longitudinal direction of the polyethylene terephthalate film.

Heated air was blown onto the upper magnetic layer and the lower non-magnetic layer until about 35% of the solvents were evaporated, thereby preliminarily drying the upper magnetic layer and the lower non-magnetic layer and a magnetic field of 4000 Oe was applied onto the upper magnetic layer by a solenoid coil so that the magnetic powder particles contained in the upper magnetic layer were again oriented to the longitudinal direction of the polyethylene terephthalate film.

The magnetic powder particles contained in the upper magnetic layer were further oriented in an oblique direction with respect to the surface of the upper magnetic layer by the oblique orienting device while heated air was being blown thereonto. Drying, calendering and cutting were then effected to obtain samples #1 to 4. The oblique orientation was effected by controlling current supplied to six solenoid coils Nos. 1, 2, 3, 4, 5, 6 disposed from upstream to downstream relative to the transporting direction of the polyethylene terephthalate film so as to change the direction of the magnetic field in six stages and thereby reorient the magnetic powder particles in the upper magnetic layer to a final orientation of 45 degrees to the surface of the upper magnetic layer.

The squareness ratios in the direction of 45 degrees of the thus obtained samples #1 to 4 were measured at an Hm of 10 kOe using a sample-vibrating magnetoflux meter (manufactured by Toei Kogyo Co., Ltd.).

Table 1 shows the results of the measurement. In Table 1, "magnetic field angle" means the angle of the magnetic field to the surface of the upper magnetic layer.

As apparent from Table 1, it was found that the squareness ratios of the samples #2 to 4 oriented by controlling the current supplied to the solenoid coils Nos. 1, 2, 3, 4, 5, 6 so that the directions of the magnetic fields generated by the six solenoid coils Nos. 1, 2, 3, 4, 5, 6 gradually changed from one close to the direction parallel to the surface of the upper magnetic layer to one at an angle of 45 degrees thereto were markedly improved, whereas the squareness ratio of the sample #1 oriented by controlling the current supplied to the solenoid coils Nos. 1, 2, 3, 4, 5, 6 so that the directions of the magnetic fields generated by the six solenoid coils Nos. 1, 2, 3, 4, 5, 6 all made an angle of 45 degrees with respect to the surface of the upper magnetic layer was low.

TABLE 1

| Sample # | Magnetic Field Angle (°) | | | | | | Squareness Ratio |
|---|---|---|---|---|---|---|---|
| | No. 1 | No. 2 | No. 3 | No. 4 | No. 5 | No. 6 | |
| 1 | 45 | 45 | 45 | 45 | 45 | 45 | 0.781 |
| 2 | 23 | 23 | 23 | 45 | 45 | 45 | 0.823 |
| 3 | 15 | 15 | 30 | 30 | 45 | 45 | 0.836 |
| 4 | 8 | 15 | 23 | 30 | 38 | 45 | 0.837 |

Example 2

Magnetic recording media were manufactured in the same manner as in Example 1 except that the preliminary drying was not effected and the squareness ratios were measured in the same manner as in Example 1. The results of the measurement are shown in Table 2.

Example 3

Magnetic recording media were manufactured in the same manner as in Example 1 except that the longitudinal orientation by the pair of permanent magnets was not effected and the squareness ratios were measured in the same manner as in Example 1. The results of the measurement are shown in Table 2.

Example 4

Magnetic recording media were manufactured in the same manner as in Example 1 except that the longitudinal orientation by the pair of permanent magnets was not effected, that the preliminary drying was not effected and that the longitudinal orientation by the solenoid coil was not effected, and the squareness ratios were measured in the same manner as in Example 1. The results of the measurement are shown in Table 2.

TABLE 2

| Sample # | EXAMPLE 2 | EXAMPLE 3 | EXAMPLE 4 |
|---|---|---|---|
| 1 | 0.763 | 0.765 | 0.754 |
| 2 | 0.801 | 0.803 | 0.792 |
| 3 | 0.818 | 0.818 | 0.799 |
| 4 | 0.819 | 0.821 | 0.800 |

A comparison of Tables 1 and 2 shows that magnetic recording media having higher squareness ratios were obtained in the case where the magnetic powder particles were once oriented in the longitudinal direction and then oriented in an oblique direction. In addition, magnetic recording media having much higher squareness ratios were obtained in the case where the magnetic powder particles once oriented in the longitudinal direction and preliminarily dried were thereafter subjected to oblique orientation.

Example 5

Magnetic recording media samples #5 to 8 were obtained in the same manner as in Example 1 except that the magnetic powder particles were oriented by the magnetic field with the direction of the magnetic field finally applied to the upper magnetic layer being 90 degrees with respect to the surface the upper magnetic layer and the lower magnetic layer.

The squareness ratios in the direction of 90 degrees of the obtained samples #5 to 8 were measured in the same manner as in Example 1 and the results of the measurement are shown in Table 3.

TABLE 3

| Sample # | Magnetic Field Angle (°) | | | | | | Squareness Ratio |
|---|---|---|---|---|---|---|---|
| | No. 1 | No. 2 | No. 3 | No. 4 | No. 5 | No. 6 | |
| 5 | 90 | 90 | 90 | 90 | 90 | 90 | 0.767 |
| 6 | 45 | 45 | 45 | 90 | 90 | 90 | 0.808 |
| 7 | 30 | 30 | 60 | 60 | 90 | 90 | 0.817 |
| 8 | 15 | 30 | 45 | 60 | 75 | 90 | 0.825 |

As apparent from Table 3, the squareness ratios of the samples #6 to 8 oriented by controlling current supplied to the solenoid coils Nos. 1, 2, 3, 4, 5, 6 so that the direction of the magnetic fields generated by the six coils Nos. 1, 2, 3, 4, 5, 6 gradually changed from one close to the direction parallel to the surface of the upper magnetic layer to one at an angle of 90 degrees thereto were markedly improved, whereas the squareness ratio of the sample #5 oriented by controlling the current supplied to the solenoid coils Nos. 1, 2, 3, 4, 5, 6 so that the directions of the magnetic fields generated by the six solenoid coils Nos. 1, 2, 3, 4, 5, 6 all made an angle of 90 degrees with respect to the surface of the upper magnetic layer was low.

Example 6

Magnetic recording media were manufactured in the same manner as in Example 5 except that the preliminary drying was not effected and the squareness ratios were measured in the same manner as in Example 1. The results of the measurement are shown in Table 4.

Example 7

Magnetic recording media were manufactured in the same manner as in Example 5 except that the longitudinal orientation by the pair of permanent magnets was not effected and the squareness ratios were measured in the same manner as in Example 1. The results of the measurement are shown in Table 4.

Example 8

Magnetic recording media were manufactured in the same manner as in Example 5 except that the longitudinal orientation by the pair of permanent magnets was not effected, that the preliminary drying was not effected and that the longitudinal orientation by the solenoid coil was not effected, and the squareness ratios were measured in the same manner as in Example 1. The results of the measurement are shown in Table 4.

TABLE 4

| Sample # | EXAMPLE 2 | EXAMPLE 3 | EXAMPLE 4 |
|---|---|---|---|
| 5 | 0.751 | 0.754 | 0.743 |
| 6 | 0.197 | 0.801 | 0.780 |
| 7 | 0.804 | 0.805 | 0.789 |
| 8 | 0.809 | 0.808 | 0.792 |

A comparison of Tables 3 and 4 shows that as in the case where the oblique orientation was effected to an angle 45 degrees, magnetic recording media having higher squareness ratios were obtained in the case where the magnetic powder particles were once oriented in the longitudinal direction and then oriented in an oblique direction. In addition, magnetic recording media having much higher squareness ratios were obtained in the case where the magnetic powder particles once oriented in the longitudinal direction and preliminarily dried were thereafter subjected to oblique orientation.

The present invention has thus been shown and described with reference to specific embodiments. However, it should be noted that the present invention is in no way limited to the details of the described arrangements and Examples but changes and modifications may be made without departing from the scope of the appended claims.

For example, although the magnetic powder particles are oriented in the oblique direction with respect to the surface of the upper magnetic layer 4 in the above described embodiments, the orientation may be made to the direction perpendicular to the surface of the upper magnetic layer 4.

Further, although the magnetic powder particles are oriented in an oblique direction while dry air, heated air or the like is blown from the dry means 30 in the above described embodiments, it is not absolutely necessary to provide the dry means 30.

Furthermore, in the above described embodiments, prior to the orientation effected by the oblique orienting device 9, the magnetic powder particles contained in the upper magnetic layer are oriented in the longitudinal direction of the non-magnetic support 1 by the pair of permanent magnets 6, 6 and are again oriented in the longitudinal direction of the non-magnetic support 1 by the solenoid coil 8. However, it is not absolutely necessary to orient the magnetic powder particles in the longitudinal direction of the non-magnetic support 1 prior to the orientation effected by the oblique orienting device 9.

Moreover, in the embodiment shown in FIG. 2, the six solenoid coils 21, 22, 23, 24, 25, 26 are employed and the direction of the magnetic field to gradually changed to the final oriented angle in six stages. However, the number of solenoid coils is not limited to six and it is sufficient to provide at least two solenoid coils. Further, it is not absolutely necessary to gradually change the direction of the magnetic field to the final oriented angle in six stages and the number of stages for changing the direction of the magnetic field to the final oriented angle can be arbitrarily determined.

Furthermore, in the embodiment shown in FIG. 2, the six solenoid coils 21, 22, 23, 24, 25, 26 are employed and the direction of the magnetic field is gradually changed to the final oriented angle in six stages. However, it is not absolutely necessary to employ the solenoid coils 21, 22, 23, 24, 25, 26 but it is sufficient to control the direction of the magnetic field to change it from a direction nearly parallel to the surface of the upper magnetic layer 4 and in which the non-magnetic support 1 is transported to the final oriented angle. Further, although in the above described embodiments, the direction of the magnetic field is gradually changed to the final oriented angle from a direction nearly parallel to the surface of the upper magnetic layer 4 and in which the non-magnetic support 1 is transported by changing the strength of the magnetic field parallel to the surface of the upper magnetic layer 4, the direction of the magnetic field may be gradually changed so as to become the final oriented angle from a direction nearly parallel to the surface of the upper magnetic layer 4 and in which the non-magnetic support 1 is transported by changing the strength of the magnetic field perpendicular to the surface of the upper magnetic layer 4 without changing the strength of the magnetic field parallel to the surface of the upper magnetic layer 4 and both the magnetic fields parallel to and perpendicular to the surface of the upper magnetic layer 4 may be controlled. For example, the second magnet for generating a magnetic field in the longitudinal direction of the non-magnetic support 1 can be constituted of a single solenoid coil and the first magnet for generating a magnetic field perpendicular to the surface of the upper magnetic layer 4 can be constituted by disposing two or more magnet pairs of permanent magnets whose opposite poles face each other as aligned in the longitudinal direction of the non-magnetic support 1 with the distance between the magnets of the magnet pairs decreasing in the downstream direction, whereby the strength of the magnetic field generated by the magnet pairs increases in the downstream direction. In this case, it is also possible to form the second magnets by two or more solenoid coils and to adjust the strength of the magnetic fields generated by each of the solenoid coils.

Further, in the above described embodiments, the direction of the magnetic field is gradually changed to the final oriented direction from a direction parallel to the surface of the upper magnetic layer 4 and in which the non-magnetic support 1 is transported. However, it is sufficient for the direction of the magnetic field to be controlled to change it from a direction parallel to the surface of the upper magnetic layer 4 and in which the non-magnetic support 1 is transported to the final oriented direction and it is not absolutely necessary to gradually change the direction of the magnetic field from the direction parallel to the surface of the upper magnetic layer 4 and in which the non-magnetic support 1 is transported to the oriented direction.

Moreover, although the upper magnetic layer 4 and the lower non-magnetic layer 5 are simultaneously formed in the above described embodiments, these layers need not be simultaneously formed. It is possible to omit the non-magnetic layer.

According to the present invention, it is possible to provide a method and an apparatus for manufacturing a magnetic recording medium which can orient magnetic powder particles in a desired direction with respect to the surface of a magnetic layer and manufacture a magnetic recording medium having a high squareness ratio without increasing the size of the apparatus.

What is claimed is:

1. A method for manufacturing a magnetic recording medium comprising;
   a. forming at least one magnetic layer containing magnetic powder particles on a web-like non-magnetic support;
   b. transporting the non-magnetic support in a transport direction;
   c. applying a first magnetic field to the magnetic layer in a plane that is perpendicular to a surface of the magnetic layer;
   d. applying a second magnetic field to the magnetic layer in a plane that is parallel to the surface of the magnetic layer by providing a fixed electric current to each of a plurality of electromagnets arranged in the transport direction; wherein an angle of a magnetic field formed by the first and second magnetic field with respect to the transport direction only gradually increases as the non-magnetic support is transported in the transport direction so that an orientation of the magnetic powder particles is increased in an oblique direction with respect to the surface of the magnetic layer as the non-magnetic support is transported.

2. The method of claim 1 wherein the magnetic powder particles are oriented in the oblique direction by the second magnetic field after they have been once oriented in the transport direction.

3. The method of claim 2 wherein the magnetic powder particles are oriented while the magnetic layer is being dried.

4. The method of claim 1 wherein the magnetic powder particles are oriented while the magnetic layer is being dried.

5. In apparatus for manufacturing a magnetic recording medium comprising:
   a. at least one first magnet for generating a first magnetic field perpendicular to a surface of at least one magnetic layer formed on a non-magnetic support and containing magnetic powder particles;
   b. a plurality of second magnets for generating a second magnetic field parallel to the surface of the magnetic layer;
   c. an electric current source to supply a fixed value to each of the second magnets before the non-magnetic support is introduced to the second magnetic field wherein the second magnetic field decreases gradually in strength from one end of the first magnetic field to the other end so that an orientation of the magnetic powder particles is increased in an oblique direction with respect to the surface of the magnetic layer as the non-magnetic support is being transported.

6. The apparatus of claim 5 wherein the second magnets are provided with an extended portion extending from the one end in a direction away from the other end.

7. The apparatus of claim 6 further comprising a drier wherein the magnetic powder particles are oriented while being dried.

8. The apparatus of claim 6 wherein the first magnet includes permanent magnets disposed so that opposite poles thereof face each other and wherein the second magnets includes at least two solenoid coils.

9. The apparatus of claim 6 wherein a resulting magnetic field formed by the first and second magnetic field has an angle that only gradually increases with regard to the transport direction.

10. The apparatus of claim 5 further comprising a drier wherein the magnetic powder particles are oriented while being dried.

11. The apparatus of claim 5 wherein the first magnet includes permanent magnets disposed so that opposite poles thereof face each other and wherein the second magnets includes at least two solenoid coils.

12. A method for manufacturing a magnetic recording medium comprising the steps of:
   a. forming at least one magnetic layer containing magnetic powder particles on a web-like non-magnetic support
   b. transporting the non-magnetic support in a transport direction; and,
   c. applying a magnetic field to the magnetic layer by a plurality of magnets wherein the field has two components with a first component of the field being in a plane that is perpendicular to a surface of the magnetic layer and a second component of the field being in a plane that is parallel to the transport direction in which the strength of the magnetic field in the transport direction is controlled between a coercive force of magnetic powder particles in the non-magnetic support and approximately 100000 Oe, wherein an electric current for each of the plurality of magnets of the second component of the field is controlled to a fixed value respectively before applying the magnetic field to the non-magnetic support such that an angle of the magnetic field with respect to the transport direction only gradually increases by controlling electrical current supplied to the solenoid coils as the non-magnetic support is transported in the transport direction, thereby orienting the magnetic powder particles in an oblique direction with respect to the surface of the magnetic layer.

* * * * *

UNITED STATES PATENT AND TRADEMARK OFFICE
CERTIFICATE OF CORRECTION

| | |
|---|---|
| PATENT NO. | : 6,261,647 B1 |
| DATED | : July 17, 2001 |
| INVENTOR(S) | : Kazunori Komatsu et al. |

It is certified that error appears in the above-identified patent and that said Letters Patent is hereby corrected as shown below:

<u>Title page,</u>
Foreign Application Priority Data,
Line 1, delete "Jan. 2, 1995" and substitute -- Feb. 1, 1995 -- in its place.

Signed and Sealed this

Twelfth Day of March, 2002

*Attest:*

JAMES E. ROGAN
*Director of the United States Patent and Trademark Office*

*Attesting Officer*